(12) United States Patent
An et al.

(10) Patent No.: US 12,277,149 B2
(45) Date of Patent: Apr. 15, 2025

(54) RESPONSE DETERMINING DEVICE AND CONTROLLING METHOD OF ELECTRONIC DEVICE THEREFOR

(71) Applicant: SAMSUNG ELECTRONICS CO., LTD., Suwon-si (KR)

(72) Inventors: Jaehyung An, Suwon-si (KR); Hoyoung Kim, Suwon-si (KR); Dongil Yang, Suwon-si (KR); Jiyeon Lee, Suwon-si (KR); Cheolseung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 17/712,301

(22) Filed: Apr. 4, 2022

(65) Prior Publication Data

US 2022/0237215 A1    Jul. 28, 2022

Related U.S. Application Data

(63) Continuation of application No. PCT/KR2022/000414, filed on Jan. 11, 2022.

(30) Foreign Application Priority Data

Jan. 22, 2021    (KR) .................... 10-2021-0009286

(51) Int. Cl.
*G06F 16/3329*    (2025.01)
*G06F 16/334*    (2025.01)
(Continued)

(52) U.S. Cl.
CPC ...... *G06F 16/3329* (2019.01); *G06F 16/3344* (2019.01); *G06F 40/289* (2020.01); *G06F 40/30* (2020.01)

(58) Field of Classification Search
CPC .............. G06F 16/3329; G06F 16/3344; G06F 40/289; G06F 40/30
See application file for complete search history.

(56) References Cited

U.S. PATENT DOCUMENTS

2014/0229506 A1    8/2014    Lee
2016/0179801 A1 *  6/2016    Venkataraman ........ G06F 16/48
                                                     707/771
(Continued)

FOREIGN PATENT DOCUMENTS

JP    2019-091130 A    6/2019
KR    2003-0006201 A    1/2003
(Continued)

OTHER PUBLICATIONS

Communication dated May 2, 2022, issued by the International Searching Authority in counterpart International Application No. PCT/KR2022/000414 (PCT/ISA/210 and PCT/ISA/237).
(Continued)

*Primary Examiner* — Pierre Louis Desir
*Assistant Examiner* — Daniel W Chung
(74) *Attorney, Agent, or Firm* — Sughrue Mion, PLLC

(57) ABSTRACT

A method of controlling an electronic device includes, based on obtaining first text information corresponding to a user query, identifying a main query corresponding to the first text information; obtaining a plurality of responses related to the main query; identifying a plurality of phrases included in the first text information; identifying at least one first phrase corresponding to the main query among the plurality of phrases based on a similarity between the plurality of phrases and the main query; identifying, among the plurality of responses, at least one first response corresponding to a remaining second phrase, among the plurality of phrases except the at least one first phrase, based on a similarity between each of the plurality of responses and the remaining (Continued)

second phrase; and providing second text information corresponding to a remaining second response other than the at least one first response among the plurality of responses.

11 Claims, 7 Drawing Sheets

(51) Int. Cl.
  *G06F 40/289* (2020.01)
  *G06F 40/30* (2020.01)

(56) References Cited

U.S. PATENT DOCUMENTS

| | | | |
|---|---|---|---|
| 2019/0155944 A1* | 5/2019 | Mahata | G06F 16/93 |
| 2019/0179903 A1 | 6/2019 | Terry et al. | |
| 2020/0356604 A1* | 11/2020 | Macdougall | G06N 20/00 |
| 2022/0012431 A1* | 1/2022 | Turkkan | G06F 40/284 |

FOREIGN PATENT DOCUMENTS

| | | |
|---|---|---|
| KR | 10-0508549 B1 | 8/2005 |
| KR | 10-0523289 B1 | 10/2005 |
| KR | 10-2010-0073793 A | 7/2010 |
| KR | 10-1678787 B1 | 12/2016 |
| KR | 10-2017-0086353 A | 7/2017 |
| KR | 10-1872863 B1 | 7/2018 |
| KR | 10-2019-0066988 A | 6/2019 |
| KR | 10-2018283 B1 | 11/2019 |
| KR | 10-2103273 B1 | 4/2020 |

OTHER PUBLICATIONS

Communication issued on Mar. 27, 2024 by the European Patent Office for European Patent Application No. 22742752.3.

* cited by examiner

RESPONSE DETERMINING DEVICE AND CONTROLLING METHOD OF ELECTRONIC DEVICE THEREFOR

CROSS-REFERENCE TO RELATED APPLICATIONS

This application is a continuation of International Application No. PCT/KR2022/000414 designating the United States, filed on Jan. 11, 2022, in the Korean Intellectual Property Receiving Office and claiming priority to Koran Patent Application No. 10-2021-0009286, filed on Jan. 22, 2021, in the Korean Intellectual Property Office, the disclosures of all of which are incorporated by reference herein in their entireties.

BACKGROUND

Field

The disclosure relates to an electronic device and a method of controlling the electronic device and, more particularly, to an electronic device capable of providing a response to a user query and a method of controlling of the electronic device.

Description of Related Art

According to development of an artificial intelligence (AI) field, a service using a "chatbot" capable of performing a specific task through dialogue with a user is provided. A "customer service chatbot (CS chatbot)" may operate in a manner that identifies a main query included in a user query and provides a plurality of responses corresponding to the identified main query.

An expression which a user may use to input a user query can be very diverse, and if the information included in the user query is unclear, there is a problem that it is difficult to identify a main query of the user query. In order to more clearly classify a user query, the related art technology increases a type of a main query that may be matched to a user query in the construction of a database, or provides a user with a plurality of queries in response to a user query to obtain detailed information related to the user query.

According to a method of increasing the type of a main query that may be matched with a user query, it causes a limitation that it is difficult to construct and manage a database, and since a process of matching a user query with a detailed main query is required, a recognition rate may be degraded, and as the number of main queries matched with a user query increases, main queries of a similar meaning may be duplicated, or the like.

According to a method of providing a plurality of queries in response to a user query to a user, a user who desires to have a quick response needs to perform additional steps to provide detailed replies to the plurality of queries. Thus, the user may feel inconvenient, and may likely transfer from a chatbot to a customer service manager, which decreases utilization of the chatbot and the like.

Therefore, there is a need for a technology that provides an efficient and accurate chatbot service and improves user convenience by providing a response to the user query by quickly and accurately determining the user's intent in the user query.

SUMMARY

The disclosure is to address at least the above-mentioned problems and/or disadvantages and to provide at least the advantages described below. Accordingly, the disclosure is to provide an electronic device capable of providing an optimized response to a user query by analyzing information included in the user query and a controlling method of the electronic device.

According to an aspect of an example embodiment, an electronic device includes a memory configured to store data on a plurality of modules related to providing a response to a user query; and a processor configured to execute the plurality of modules to, based on obtaining first text information corresponding to the user query, identify a main query corresponding to the first text information and obtain a plurality of responses related to the main query, wherein the processor is further configured to: identify a plurality of phrases included in the first text information, identify at least one first phrase corresponding to the main query among the plurality of phrases based on a similarity between each of the plurality of phrases and the main query, identify, among the plurality of responses, at least one first response corresponding to a remaining second phrase, among the plurality of phrases except the at least one first phrase, based on a similarity between each of the plurality of responses and the remaining second phrase, and provide second text information corresponding to a remaining second response, the remaining second response being a response other than the at least one first response among the plurality of responses.

The processor may obtain, with respect to each of the plurality of phrases, a first score based on a similarity between the main query and each of the plurality of phrases, and identify the at least one first phrase, among the plurality of phrases, of which the first score is greater than or equal to a preset first threshold value.

The processor may obtain, with respect to each of the plurality of responses, a second score based on a similarity between the remaining second phrase and each of the plurality of responses, and identify the at least one first response, among the plurality of responses, of which the second score is greater than or equal to a preset second threshold value.

The processor may identify at least one context corresponding to the remaining second phrase among a plurality of predefined contexts, and identify the at least one first response, among the plurality of responses, corresponding to the at least one context.

The processor may identify the plurality of phrases included in the first text information corresponding to the user query based on at least one of a conjunction, an ending mark, or a punctuation included in the first text information corresponding to the user query.

The processor may, based on information indicative of positivity or negativity for the at least one first response being included in the remaining second phrase, provide the at least one first response and the information indicative of positivity or negativity for the at least one first response along with the second text information corresponding to the remaining second response.

The electronic device may further include a communicator interface, and the processor may receive the first text information corresponding to the user query from an external device through the communicator interface, and control the communicator interface to transmit the second text information corresponding to the remaining second response to the external device.

The electronic device may further include a display, and the processor may control the display to display a user interface (UI) including the second text information corresponding to the remaining second response, and receive a user input related to the remaining second response through the UI.

The electronic device may further include a microphone, and the processor may receive a voice signal corresponding to the user query through the microphone, and obtain the first text information corresponding to the user query based on the voice signal.

The electronic device may further include a speaker, and the processor may obtain a voice signal corresponding to the at least one first response based on text information corresponding to the at least one first response, and output the voice signal corresponding to the at least one first response through the speaker.

According to an aspect of an example embodiment, a method of controlling an electronic device includes, based on obtaining first text information corresponding to a user query, identifying a main query corresponding to the first text information; obtaining a plurality of responses related to the main query; identifying a plurality of phrases included in the first text information; identifying at least one first phrase corresponding to the main query among the plurality of phrases based on a similarity between the plurality of phrases and the main query; identifying, among the plurality of responses, at least one first response corresponding to a remaining second phrase, among the plurality of phrases except the at least one first phrase, based on a similarity between each of the plurality of responses and the remaining second phrase; and providing second text information corresponding to a remaining second response, the remaining second response being a response other than the at least one first response among the plurality of responses.

The identifying the at least one phrase may include obtaining, with respect to each of the plurality of phrases, a first score based on a similarity between the main query and each of the plurality of phrases; and identifying the at least one first phrase of which the first score is greater than or equal to a preset first threshold value.

The identifying the at least one response may include obtaining, with respect to each of the plurality of responses, a second score based on a similarity between the remaining second phrase and each of the plurality of responses; and identifying the at least one first response, among the plurality of responses, of which the second score is greater than or equal to a preset second threshold value.

The identifying the at least one response may include identifying at least one context corresponding to the remaining second phrase among a plurality of predefined contexts; and identifying the at least one first response, among the plurality of responses, corresponding to the at least one context.

The identifying the plurality of phrases may include identifying the plurality of phrases included in the first text information corresponding to the user query based on at least one of a conjunction, an ending mark, or a punctuation included in the first text information corresponding to the user query.

The method may further include, based on information indicative of positivity or negativity for the at least one first response being included in the remaining second phrase, providing the at least one first response and the information indicative of positivity or negativity for the at least one first response along with the second text information corresponding to the remaining second response.

The method may further include receiving the first text information corresponding to the user query from an external device through a communicator interface, and controlling the communicator interface to transmit the second text information corresponding to the remaining second response to the external device.

The electronic device may further include receiving a voice signal corresponding to the user query through a microphone, and obtaining the first text information corresponding to the user query based on the voice signal.

The method may further include obtaining a voice signal corresponding to the at least one first response based on text information corresponding to the at least one first response, and outputting the voice signal corresponding to the at least one first response through a speaker.

According to an aspect of an example embodiment, a non-transitory computer readable recordable medium includes a program to execute a method of controlling an electronic device, the method including, based on obtaining first text information corresponding to a user query, identifying a main query corresponding to the first text information; obtaining a plurality of responses related to the main query; identifying a plurality of phrases included in the first text information; identifying at least one first phrase corresponding to the main query among the plurality of phrases based on a similarity between the plurality of phrases and the main query; identifying, among the plurality of responses, at least one first response corresponding to a remaining second phrase, among the plurality of phrases except the at least one first phrase, based on a similarity between each of the plurality of responses and the remaining second phrase; and providing second text information corresponding to a remaining second response, the remaining second response being a response other than the at least one first response among the plurality of responses.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
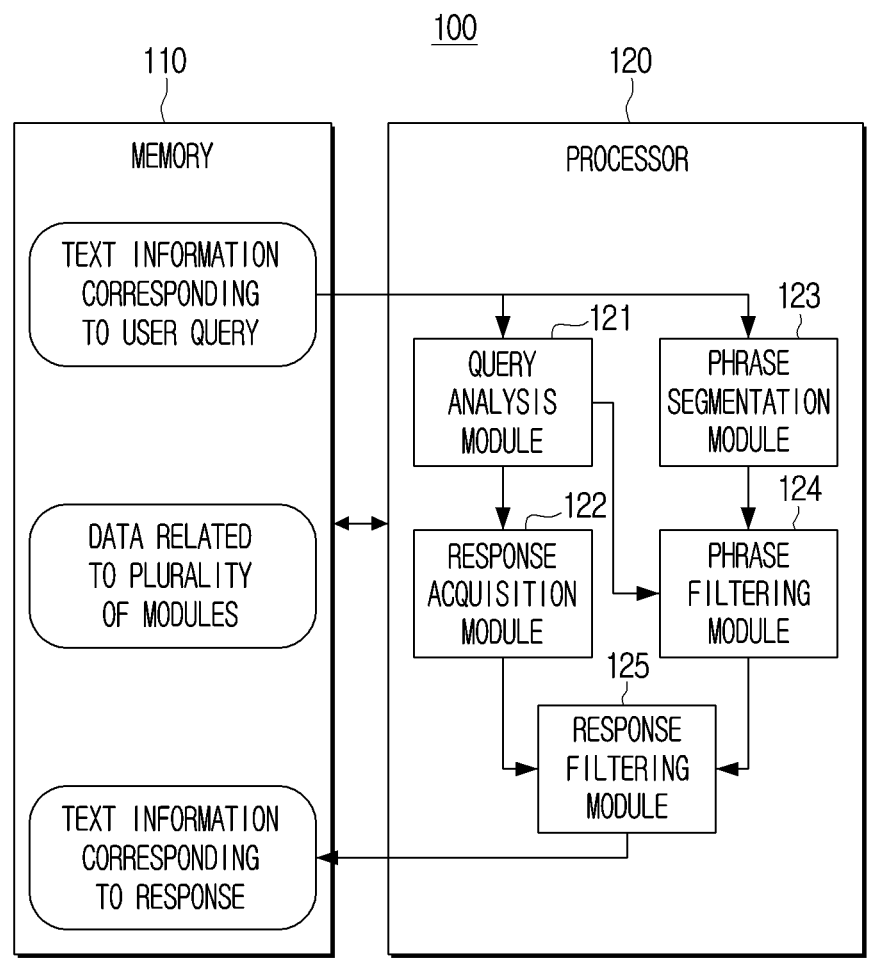
FIG. 1 is a diagram illustrating a configuration of an electronic device according to an embodiment of the disclosure.

One or more example embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a numerical value, a function, an operation, or a component such as a part), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B together.

The terms such as "first," "second," and so on may be used to describe a variety of elements, but the elements may not be limited by these terms regardless of order and/or importance. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may include a case in which a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and regions in the drawings are schematically drawn. Accordingly, the technical spirit of the disclosure is not limited by the relative size or spacing depicted in the accompanying drawings.

Embodiments of the disclosure will be described in detail with reference to the accompanying drawings to aid in the understanding of those of ordinary skill in the art.

Figure 2:
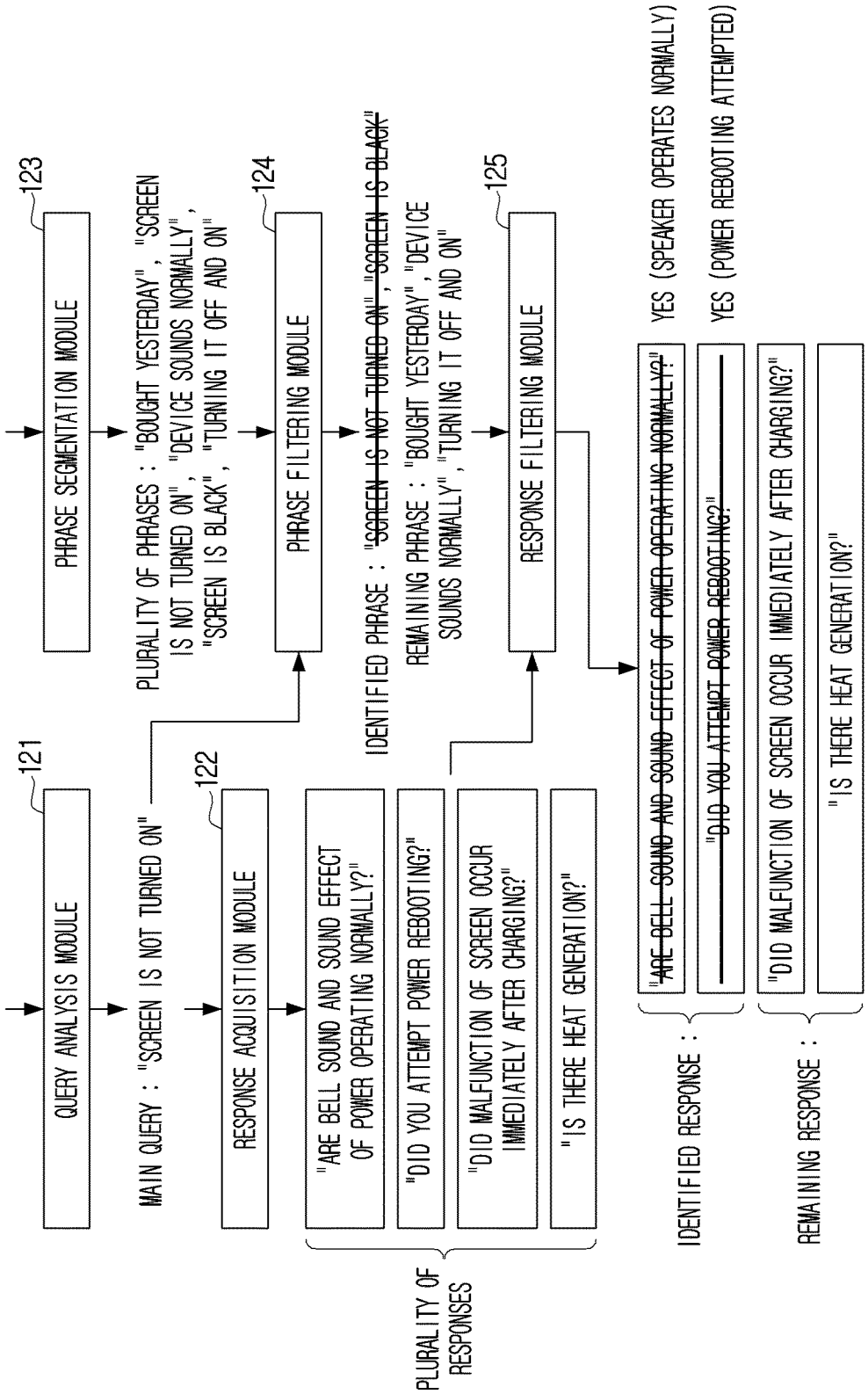
FIG. 2 is a diagram illustrating operations of a plurality of modules according to an embodiment of the disclosure.

FIG. 1 is a diagram illustrating a configuration of an electronic device according to an embodiment of the disclosure; and FIG. 2 is a diagram illustrating operations of a plurality of modules according to an embodiment of the disclosure. Hereinbelow, an embodiment will be described with reference to FIGS. 1 and 2.

An "electronic device 100" according to an embodiment of the disclosure refers to a device capable of providing a response to a user query (question). The electronic device 100 refers to a device which may provide a so-called "chatbot" service or "customer service (CS) chatbot" service, and may be implemented with various types of devices such as a user terminal device including a smartphone, a tablet PC, or the like, a server, a cloud server, and an edge computing device, or the like. There is no specific limitation to a type of the electronic device 100, and any device that may receive the user query, analyze the received query, and provide an interactive response thereto may correspond to the electronic device 100.

As shown in FIG. 1, the electronic device 100 according to the disclosure may include a memory 110 and a processor 120. The processor 120 may include a plurality of modules, such as a query analysis module 121, a response acquisition module 122, a phrase segmentation module 123, a phrase filtering module 124, and a response filtering module 125. A plurality of modules according to the disclosure may be implemented as a hardware module, a software module, or a combination thereof, and when a plurality of modules are implemented in a software module, the processor 120 may access the software module by loading the software module stored in the memory 110.

At least one instruction regarding the electronic device 100 may be stored in the memory 110. In addition, an operating system (O/S) for driving the electronic device 100 may be stored in the memory 110. The memory 110 may store various software programs or applications for operating the electronic device 100 according to various embodiments. The memory 110 may include a semiconductor memory such as a flash memory, a magnetic storage medium such as a hard disk, or the like.

For example, the memory 110 may store various software modules for operating the electronic device 100, and the processor 120 may control the operation of the electronic device 100 by executing various software modules that are stored in the memory 110. That is, the memory 110 may be accessed by the processor 120, and may perform reading, recording, modifying, deleting, updating, or the like, of data by the processor 120.

It is understood that the term memory 110 may be used to refer to a ROM, RAM, or a memory card (for example, a micro SD card, a memory stick) or any other type of memory that is mounted to the electronic device 100.

According to various embodiments according to the disclosure, the memory 110 may store text information corresponding to a user query and text information corresponding to the response. Data related to a plurality of modules for providing a response to a user query may be stored in the memory 110. The memory 110 may store data on the parameters and weights of a neural network model included in some modules of the plurality of modules, and learning data for learning of the neural network model. The memory 110 may store a database for application of rules in accordance with the disclosure. For example, the memory 110 may store a database including information on a plurality of main queries and information on a plurality of responses respectively corresponding to the plurality of main queries.

In addition, various information related to the objective (e.g., providing a response to a user query) of the disclosure may be stored in the memory 110, and the information stored in the memory 110 may be updated based on an input from an external device or by a user input.

The processor 120 may control overall operations of the electronic device 100. The processor 120 may be connected to a configuration of the electronic device 100 including the memory 110, and may control overall operations of the electronic device 100 by executing at least one command stored in the memory 110.

The processor 120 may be implemented in various ways. For example, the processor 120 may be implemented as at least one of an application specific integrated circuit (ASIC), an embedded processor, a microprocessor, a hardware control logic, a hardware finite state machine (FSM), a digital signal processor (DSP), or the like. Further, the processor 120 may include at least one of a central processing unit (CPU), a graphic processing unit (GPU), a main processing unit (MPU), or the like.

According to various embodiments, the processor may analyze a user query through a plurality of modules such as the query analysis module 121, the response acquisition module 122, the phrase segmentation module 123, the phrase filtering module 124, and the response filtering module 125 and may provide an interactive response.

The processor 120 may obtain text information corresponding to a user query. The text information corresponding to the user query may be obtained based on a user input to the electronic device 100, or may be obtained by receiving the text information from an external device connected to the electronic device 100. A method of obtaining text information corresponding to a user query will be described in detail with reference to FIG. 5.

As shown in FIG. 2, a process of obtaining a response to a user query will be described based on an example of obtaining text information "I bought the device yesterday, but screen is not turned on suddenly. Although the device sounds normally, the screen is black, and it remains the same after turning it off and on again" as text information corresponding to a user query.

When the text information corresponding to the user query is obtained, the processor 120 may identify a main query corresponding to the text information. The process of identifying a main query corresponding to the text information may be performed through the query analysis module 121.

The query analysis module 121 refers to a module capable of outputting a main query corresponding to the inputted text information. When text information corresponding to a query is input, the query analysis module 121 may identify a main query matching the inputted text information among a plurality of predefined main queries and output information on the identified main query. The query analysis module 121 refers to a module that may analyze a target intent included in the inputted text information and output the analysis result. Information about a plurality of predefined main queries may be previously constructed in the form of a database and may be stored in the memory 110.

The query analysis module 121 may be implemented based on a neural network model trained to output information on a probability that the intent included in the inputted text information corresponds to a predefined class (category). The query analysis module 121 may include a multi-intent detection module capable of analyzing a plurality of intents included in the inputted text information and identifying a plurality of main queries corresponding to the text information.

Referring to the example of FIG. 2, if the text information "I bought the device yesterday, but screen is not turned on suddenly. Although the device sounds normally, the screen is black, and it remains same after turning it off and on again" is input, the query analysis module 121 may identify "screen is not turned on" as the main query corresponding to the text information and may output the information on the identified main query.

If the main query is identified, the processor 120 may obtain a plurality of responses related to the main query. The process of obtaining a plurality of responses may be performed through the response acquisition module 122.

The response acquisition module 122 refers to a module which may output a plurality of responses corresponding to an inputted main query. When information on the main query is received from the query analysis module 121, the response acquisition module 122 may identify a plurality of responses that match the input main query among the plurality of predefined responses, and may output information on the identified plurality of responses. The information on the predefined plurality of responses may be previously constructed in the form of a database along with information about a plurality of main queries and may be stored in the memory 110. In the memory 110, information on a plurality of responses corresponding to a plurality of main queries may be constructed in a database format and stored, along with information about a plurality of main queries.

Referring to the example of FIG. 2, when a main query "the screen is not turned on" is inputted, the response acquisition module 122 may receive a plurality of responses such as "Are a bell sound and a sound effect of power operating normally?", "Did you attempt power rebooting?", "Did a malfunction of a screen occur immediately after charging?", "Is there heat generation?". As such, the plurality of responses may include at least one query to obtain detailed information related to the corresponding main query. The embodiment is not limited thereto and the plurality of responses may include a response to request a user to take a particular action. When the electronic device 100 according to an embodiment is implemented to provide a CS chatbot service, the plurality of responses may include a subsequent query to accurately grasp a symptom of the product which the user wishes to resolve through the user query or a response to guide self-action to solve the symptom of the product, or the like.

As described above, the processor 120 may obtain a plurality of responses corresponding to the user query through the query analysis module 121 and the response acquisition module 122. In the above-described process, information other than information corresponding to the main query among the information included in the user query is not considered. Accordingly, if all of the plurality of responses identified as corresponding to the main query are provided to the user, an unnecessary response may be included in the plurality of responses in view of the information included in the user query.

When a plurality of responses include a query for obtaining detailed information related to a main query, the plurality of responses may include a query asking a user for information that is unnecessary in view of the information included in the user query. For example, in the example of FIG. 2 described above, although information such as "although the device sounds normally" is included in the text information corresponding to a user query, a response such as "Are a bell sound and a sound effect of power operating normally?" may be provided, and even if the text information corresponding to the user query includes "turning it off and on", a response such as "Did you attempt power rebooting?" may be provided.

The processor 120 according to an example embodiment may filter information included in a user query among a plurality of responses by using the phrase segmentation module 123, the phrase filtering module 124, and the response filtering module 125. Hereinafter, operations and the embodiments of the phrase segmentation module 123, the phrase filtering module 124, and the response filtering module 125, respectively, will be described.

The processor 120 may identify a plurality of phrases included in the text information corresponding to the user query. The process of identifying a plurality of phrases may be performed through the phrase segmentation module 123.

The phrase segmentation module 123 refers to a module capable of segmenting input text information into a plurality of phrases and outputting a result for each of the plurality of phrases. When text information corresponding to a user query is input, the phrase segmentation module 123 may segment the inputted text information into a plurality of phrases by identifying each of the plurality of phrases included in the inputted text information, and may output information on the plurality of segmented phrases.

In the disclosure, the "phrase" is one criterion for specifying an element constituting at least one sentence corresponding to a user query, and a specific criterion may vary according to an embodiment. The term "phrase" may be replaced with terms such as "passage" or "syntax".

According to an embodiment, the phrase segmentation module 123 may identify a plurality of phrases included in the text information based on a conjunction, an ending mark, or a punctuation mark included in the text information. According to another embodiment, the phrase segmentation module 123 may identify a plurality of phrases included in the text information using a neural network model trained with a labeling data set. If the query analysis module 121 includes a multi-intent detection module as described above, the phrase segmentation module 123 may identify a plurality of phrases included in the text information based on each of the identified plurality of intents.

Referring to the example of FIG. 2, if the text information "I bought the device yesterday, but screen is not turned on suddenly. Although the device sounds normally, the screen is black, and it remains same after turning it off and on again" is input, the phrase segmentation module 123 may identify a conjunction (such as "although", "and", and "after" in the text information corresponding to the user query shown in FIG. 2), an ending mark (such as a period), or a punctuation mark (such as a comma), and accordingly identify a plurality of phrases, such as "bought the device yesterday", "screen is not turned on", "the device sounds normally", "the screen is black", "turning it off and on", and may output information about the identified phrases.

The processor 120 may identify at least one phrase corresponding to a main query among the plurality of phrases based on the similarity between the plurality of phrases and the main query. Specifically, the process of identifying at least one phrase may be performed through the phrase filtering module 124.

The phrase filtering module 124 refers to a module for filtering at least one phrase corresponding to a main query among a plurality of phrases. When information on a plurality of phrases is input from the phrase segmentation module 123 and information on a main query is input from the query analysis module 121, the phrase filtering module 124 may identify at least one phrase corresponding to a main query among a plurality of phrases and identify remaining phrases except the at least one phrase corresponding to the main query, and output information on the remaining phrases.

For convenience, a phrase identified as corresponding to a main query among a plurality of phrases is referred to as "at least one phrase", and the remaining phrase except at the least one phrase among a plurality of phrases (i.e., a result filtered through the phrase filtering module 124) is referred to as the "remaining phrases".

The phrase filtering module 124 may convert information about each of a plurality of inputted phrases and main queries into a vector. A process of converting information about each of a plurality of phrases and main queries into a vector may be performed using a neural network model referred to as a so-called feature extraction model or a word embedding model. The feature extraction or word embedding refers to converting a word included in the text information into various types of vectors, such as a dense vector or a sparse vector, and specifically, refers to a process of digitizing the meaning of a word to reflect the similarity (or correlation) between words. What is obtained through the feature extraction model or the word embedding model may be a vector or various indicators capable of digitizing the meaning of a word, such as a histogram.

The type of the feature extraction model or the word embedding model has no specific limitation, and may be implemented with one of the models such as Word2Vec, (Global Vectors for Word Representation (GloVe), and Bidirectional Encoder Representations from Transformers (BERT). The BERT refers to a model capable of obtaining the embedding vector for each word in consideration of a bidirectional context of each word.

As described above, when a vector for each of a plurality of inputted phrases and a vector for each of the main query is obtained, the phrase filtering module 124 may output, for each of a plurality of phrases, a first score for similarity with a main query, indicating whether the vectors of the main query and a corresponding phrase are in a similar position in the vector space. For example, the phrase filtering module 124 may calculate a first score for similarity between each of a plurality of phrases and the main query using technologies such as an Euclidean distance or cosine similarity. In the disclosure, the first score according to the disclosure refers to a value that quantitatively represents the similarity between each of a plurality of phrases and the main query.

As described above, when a first score for similarity with a main query is obtained for each of a plurality of phrases, the phrase segmentation module 123 may identify at least one phrase corresponding to the main query among a plurality of phrases based on the first score. A remaining phrase except the at least one phrase corresponding to the main query among the plurality of phrases may also be identified.

According to an embodiment, the phrase filtering module 124 may identify one or more phrases having a first score greater than or equal to a preset first threshold value as at least one phrase corresponding to a main query, and accordingly, one or more phrases having a first score of less than the preset first threshold value may be identified as the remaining phrase.

According to another embodiment, the phrase filtering module 124 may identify, as at least one phrase corresponding to a main query, a phrase corresponding to a predetermined order or a predetermined ratio after arranging a plurality of phrases according to a plurality of first scores for the plurality of phrases in descending order, and accordingly the remaining phrase may be identified.

Referring to FIG. 2, if a plurality of phrases include "I bought the device yesterday", "but screen is not turned on", "the device sounds normally", "the screen is black" and "turning it off and on again", the phrase filtering module 124 may identify "the screen is not turned on" and "the screen is not seen", as at least one phrase corresponding to the main query "screen is not turned on", and accordingly, the remaining phrases "I bought the device yesterday", "the device sounds normally", and "turning it off and on again" may be identified.

The processor 120 may identify at least one response corresponding to the remaining phrases of the plurality of responses based on the similarity between the plurality of responses and the remaining phrases except at least one phrase identified as corresponding to a main query among the plurality of phrases. Specifically, a process of identifying at least one response may be performed via the response filtering module 125.

The response filtering module 125 refers to a module that filters at least one response that does not correspond to the main query among the plurality of responses (i.e., corresponding to the remaining phrase except at least one phrase identified as corresponding to a main query among the plurality of phrases). When information on a plurality of responses is input from the response acquisition module 122 and information on the remaining phrase from the phrase filtering module 124 is input, the response filtering module 125 may identify at least one response corresponding to the remaining phrase among the plurality of responses, and output information on the remaining responses other than the identified at least one response among the plurality of responses. The response filtering module 125 may include at least one neural network trained to perform the operations as described above.

For convenience of describing the disclosure, the response identified as not corresponding to the main query is simply referred to as at least one response (or at least one unnecessary response), and the remaining response (i.e., the result filtered through the response filtering module 125) except for the at least one unnecessary response among the plurality of responses is referred to as the remaining response.

The response filtering module 125 may convert information about each of the plurality of responses and the remaining phrase into a vector, and may output a second score for each of the plurality of responses according to whether the vector of each response and the remaining phrase exist in a similar position in the vector space. Here, "the second score" according to the disclosure refers to a value quantitatively indicating the similarity between each of the plurality of responses and the remaining phrases.

According to an embodiment, the response filtering module 125 may identify, among the plurality of responses, one or more responses of which the second score is greater than or equal to a preset second threshold value as the at least one unnecessary response, and accordingly, one or more responses of which the second score is less than the second threshold value among the plurality of responses may be identified as the remaining response (that is, identified as being relevant to the main query and thus filtered through the response filtering module 125).

According to another embodiment, the response filtering module 125 may align a plurality of responses according to the second score of the plurality of responses in a descending order and then may identify a response corresponding to a predetermined number or a predetermined ratio in the aligned plurality of responses as at least one unnecessary response, and the remaining response may be identified accordingly.

Referring to the example of FIG. 2, if a plurality of responses are input such as "are a bell sound and a sound effect of power operating normally?", "did you attempt power rebooting?", "did a malfunction of a screen occur immediately after charging?" and "is there heat generation?", the response filtering module 125 may identify, among a plurality of responses, "are a bell sound and a sound effect of power operating normally"?, which is a response corresponding to "the device sounds normally", and "did you attempt power rebooting?", which is a response corresponding to "turning it off and on again", as at least one unnecessary response. Accordingly, remaining responses of "did a malfunction of a screen occur immediately after charging?" and "is there heat generation?" may be identified as remaining responses. In the example of FIG. 2, it is assumed that there is no response corresponding to the phrase "I bought the device yesterday" among a plurality of responses.

The process of obtaining the second score may be similar to the process of obtaining the first score as described above in that the step of obtaining the second score is similar to the process of obtaining a score related to the similarity by comparing the sentence and the phrase. Therefore, various embodiments of the process of obtaining the first score may likewise be applied to the process of obtaining the second score, and the phrase filtering module 124 and the response filtering module 125 may be implemented as one integrated module.

When at least one response (or at least one unnecessary response) is identified, the processor 120 may provide text information corresponding to the remaining response other than the at least one unnecessary response of the plurality of responses. If the number of remaining responses to be provided to the user is two or more, the processor 120 may simultaneously or sequentially provide two or more responses to the user.

The processor 120 may convert text information corresponding to the identified remaining response into the form of a voice signal and provide the converted text information. Various embodiments of how a response corresponding to a user query is provided in any form will be described in more detail with reference to FIG. 5.

The processor 120 may provide information related to the identified at least one response, along with text information corresponding to the identified remaining response. For example, the processor 120 may provide information such as "YES" (speaker operates normally) and "YES (power reboot attempted)" of FIG. 2 to the user, which is described above with reference to FIG. 4. The information related to the identified at least one response may be provided in a form of text, an image, or any other type suitable for conveying the information to the user.

While the operations of the query analysis module 121, the response acquisition module 122, the phrase segmentation module 123, the phrase filtering module 124 and the response filtering module 125 are sequentially described, the disclosure is not limited to the order of the control process as described above. As an example, while a main query corresponding to the text information is identified through the query analysis module 121, a plurality of phrases included in the text information may be identified through the phrase segmentation module 123. While a plurality of responses related to the main query is obtained through the response acquisition module 122, at least one phrase corresponding to the main query among a plurality of phrases may be identified through the phrase filtering module 124.

Although one response providing process is performed for one user query in the above example, the embodiment as described above may be repeatedly performed. For example, the processor 120 may provide a subsequent question for the user's query, and when detailed information related to the subsequent question is input, the processor 120 may perform the above-described operations in FIG. 2 to provide another subsequent question for obtaining more detailed information or provide a response to guide the user's final action.

According to an embodiment as described above, the electronic device 100 may provide an optimized response to a user query by removing an unnecessary response, among a plurality of responses that may be provided in response to the user query, using information other than information corresponding to a main query among the information included in the user query.

Figure 3:
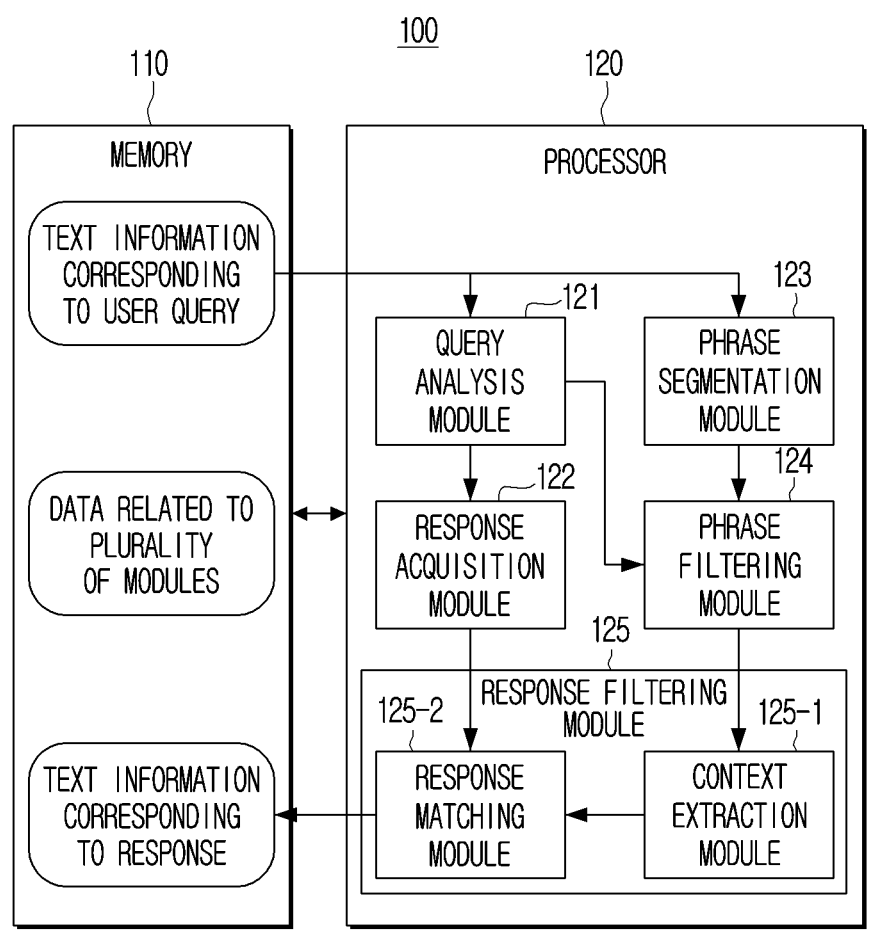
FIG. 3 is a diagram illustrating a configuration of an electronic device according to an embodiment of the disclosure.

FIG. 3 is a diagram illustrating a configuration of an electronic device according to an embodiment of the disclosure. Referring to FIG. 3, an example of a response filtering process according to an embodiment of the disclosure is described.

An embodiment of performing a response filtering process by identifying at least one unnecessary response corresponding to the identified remaining phrase of the plurality of responses is described, but according to still another embodiment, the response filtering module 125 may identify at least one context corresponding to the identified remaining phrase, and may perform a response filtering process by identifying one or more responses corresponding to the identified at least one context of the plurality of responses.

The processor 120 may identify at least one context corresponding to the remaining phrase among a plurality of predefined contexts, and identify one or more responses corresponding to at least one context of the plurality of responses as at least one response corresponding to the remaining phrase. The process of identifying at least one context corresponding to the remaining phrase and identifying one or more responses corresponding to the at least one context may be performed through a context extraction module 125-1 and a response matching module 125-2 included in the response filtering module 125, as shown in FIG. 3.

The context extraction module 125-1 may be a module capable of outputting information on a context corresponding to an inputted phrase. When information on the remaining phrase identified from the phrase filtering module 124 is input, the context extraction module 125-1 may identify at least one context matched to the identified remaining phrase of the plurality of predefined contexts, and may output the information on the identified context. The context extraction module 125-1 is a model to analyze an incidental intent other than a target intent corresponding to a main query among text information corresponding to the user query, and output the analysis result.

The information about a plurality of predefined contexts may be pre-established in the form of a database and stored in the memory 110. Since the database for information on the plurality of contexts may include only information about the context related to the chatbot service to be implemented according to the disclosure, the database may be constructed with a smaller amount of data than a conventional natural language understanding (NLU) model.

The context extraction module 125-1 may convert the information about the inputted remaining phrases into a vector. As described above with respect to the phrase filtering module 124, the process of converting information on the identified remaining phrase into a vector may also be performed using a neural network model referred to as a feature extraction model or a word embedding model. The context extraction module 125-1 may convert information about a plurality of predefined contexts into a vector. A vector corresponding to information on a plurality of predefined contexts may be previously constructed in the form of a database along with information about a plurality of contexts and stored in the memory 110.

If the vector for the identified remaining phrases and the plurality of contexts is obtained, the context extraction module 125-1 may output, for each of the identified remaining phrases, a third score for similarity with each of the plurality of contexts, indicating whether the vectors of a remaining phrase and a corresponding context are in a similar location in the vector space. In the disclosure, the third score refers to a value that quantitatively represents the similarity between the remaining phrase and each of the plurality of contexts according to the embodiment.

If a third score for similarity with each of a plurality of contexts is obtained for each of the remaining phrases, the context extraction module 125-1 may identify at least one context corresponding to each of the remaining phrases based on the third score, and may output information on the identified at least one context. The process of identifying at least one context corresponding to each of the remaining phrase based on the third score may be performed in a similar manner to identifying at least one phrase corresponding to a main query among the plurality of phrases based on the first score.

Information about various types of contexts may include "speaker operates normally", "power booting operates normally" and "power booting fails", or the like, as the format of database in the memory 110. Referring back to FIG. 2, the context extraction module 125-1 may identify "speaker operates normally" and "power booting operates normally" which are contexts respectively corresponding to "the device sounds normally" and "power off and power on again", which are remaining phrases identified, among the plurality of contexts such as "speaker operates normally", "speaker operates abnormally", "power booting operates normally" and "power booting fails".

The response matching module 125-2 refers to a module capable of outputting information on a response corresponding to at least one identified context. According to an embodiment, when information on at least one context identified from the context extraction module 125-1 is input, and information on a plurality of responses from the response acquisition module 122 is input, the response matching module 125-2 may identify one or more responses that match information for at least one identified context among the plurality of responses.

The process of identifying one or more responses may be performed using a predefined database. As described above, in the memory 110, information on determining a plurality of responses corresponding to the plurality of main queries, along with information about a plurality of main queries, may be constructed and stored in the form of a database, and information about the plurality of responses may also be constructed and stored in the form of a database.

Referring back to FIG. 2, when "the speaker operates normally" and "power booting operates normally" which are contexts respectively corresponding to "the device sounds normally" and "power off and power on again", which are remaining phrases identified among a plurality of contexts, are identified, the response matching module 125-2 may identify at least one response of "Are a bell sound and a sound effect of power operating normally?" and "Did you attempt power rebooting?" which correspond to the identified at least one context among a plurality of responses "Are a bell sound and a sound effect of power operating normally?" "Did you attempt power rebooting?", "Did a malfunction of a screen occur immediately after charging?", and "Is there heat generation?".

The information on a plurality of responses used in the process of obtaining a plurality of responses related to a main query and information on a plurality of responses used in the process of identifying a plurality of responses corresponding to the context may be constructed as different databases. In this example, information for matching information about a plurality of responses used in the process of obtaining a plurality of responses related to a main query and information on a plurality of responses used in the process of identifying a plurality of responses corresponding to the context may additionally be stored in the memory 110.

If one or more responses corresponding to the identified at least one context of the plurality of responses are identified as described above, the processor 120 may provide text information corresponding to the remaining response other than the one or more of the plurality of responses corresponding to the identified at least one context of the plurality of responses.

Figure 4:
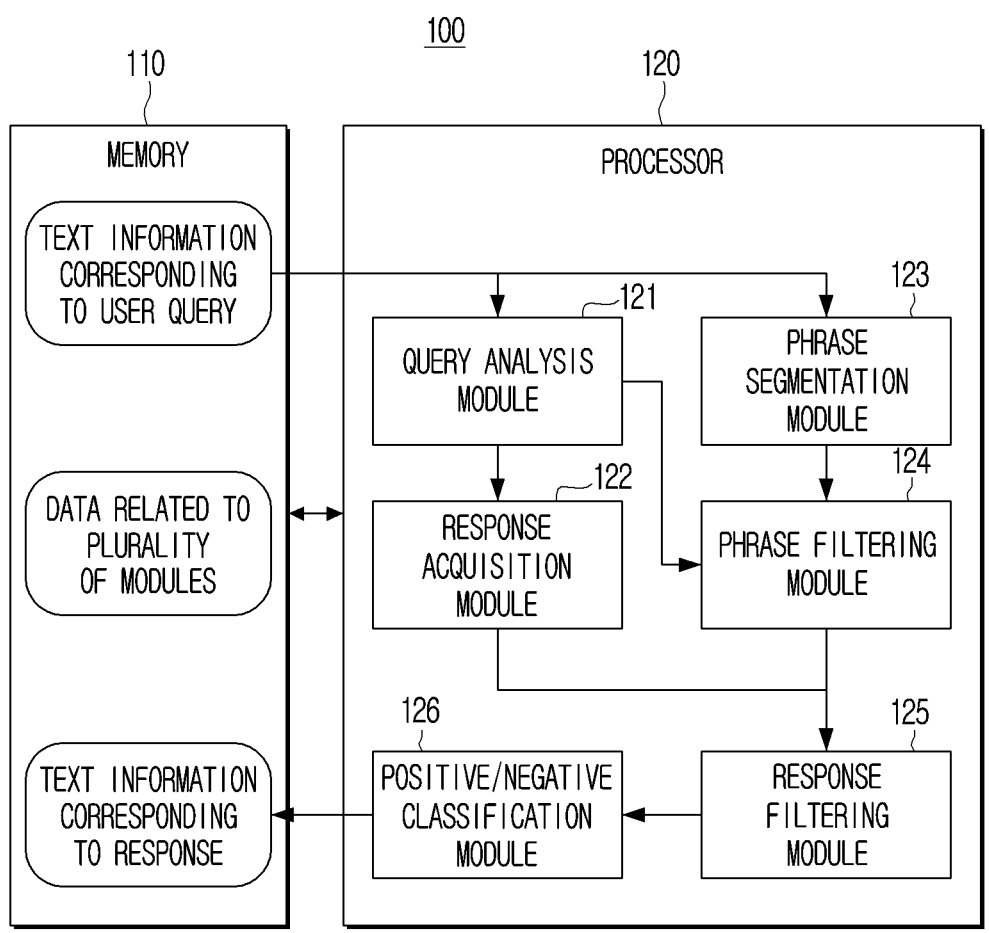
FIG. 4 is a diagram illustrating a configuration of an electronic device according to an embodiment of the disclosure.

FIG. 4 is a diagram illustrating a configuration of an electronic device according to an embodiment of the disclosure. Referring to FIG. 4, an example embodiment of a method of providing a user with a response is described in detail.

As described above, if at least one response (or at least one unnecessary response) of the plurality of responses is identified through the response filtering process, and the remaining responses other than the at least one response are identified, the processor 120 may exclude the identified at least one response and may provide only the remaining responses to the user, and may provide information for the at least one response along with the information for the remaining responses.

Based on information indicative of positivity or negativity for the at least one response being included in the remaining phrase (e.g., "the device sounds normally" in FIG. 2 includes information indicative of positivity for a response "Are a bell sound and a sound effect of power operating normally?"), the processor may provide the at least one response and information indicative of positivity or negativity for the at least one response along with text information corresponding to the remaining response. The plurality of modules according to the disclosure may further include a positive/negative classification module 126 as illustrated in FIG. 4.

The positive/negative classification module 126 refers to a module capable of obtaining information indicating a positivity or a negativity for an inputted response. The positive/negative classification module 126 may receive, from the response filtering module 125, information on at least one response identified from the plurality of responses and information on the remaining response other than the identified at least one response. In addition, the positive/negative classification module 126 may receive information about the remaining phrase except at least one phrase identified as corresponding to a main query among the plurality of phrases from the response filtering module 125. The information on the remaining phrase output from the phrase filtering module 124 may bypass the response filtering module 125 to be transmitted to the positive/negative classification module 126.

Based on an input of the information on the at least one response, the information on the remaining response, and the information on the remaining phrase, the positive/negative classification module 126 may identify whether information indicative of a positivity or negativity for at least one response of the plurality of responses to the remaining phrase is included in the remaining phrase. The process of identifying whether information indicating positivity or negativity for at least one response of the plurality of responses is included in the remaining phrase may be performed by using a neural network model trained to identify whether a pair of phrases and a response are positive/negative, or by using a neural network model trained to identify whether the context itself is positive/negative.

The neural network model is not necessarily required in obtaining information indicating positive or negative for the response input according to the positive/negative classification module 126. The positive/negative classification module 126 may operate based on predefined rules and pre-established databases. For example, a database including information indicating whether each context is positive by the electronic device of the disclosure or a developer of or a chatbot service may be pre-constructed and stored in the memory 110, and the positive/negative classification module 126 may obtain information indicating a positivity or a negativity for the inputted response, based on the information indicating whether the database is positive or negative.

As a result of identification, if information indicating positivity or negativity to at least one response of the plurality of responses is included in the remaining phrase, the processor 120 may provide, along with text information corresponding to the remaining response, at least one response and information indicating positivity or negativity for at least one response.

The processor 120 may control the display to display a user interface that includes at least one response and information indicative of positivity or negativity for at least one response. The processor 120 may display information about the at least one response and information indicative of positivity or negativity for the at least one response to be disposed in a region adjacent to each other in the user interface, or may indicate a UI element (e.g., a checked checkbox) indicating whether or not a user is positive or negative for the at least one response along with the at least one response.

Referring back to FIG. 2, among the plurality of responses of "Are a bell sound and a sound effect of power operating normally?", "Did you attempt power rebooting?", "Did a malfunction of a screen occur immediately after charging?", "Is there heat generation?", the responses "Are a bell sound and a sound effect of power operating normally?" and "Did you attempt power rebooting?" may be identified as at least one unnecessary response, and the responses "Did a malfunction of a screen occur immediately after charging?" and "Is there heat generation?" may be identified as the remaining response.

The processor 120 may provide a user with only responses "Did a malfunction of a screen occur immediately after charging?" and "Is there heat generation?", or the processor 120 may also provide the response "Are a bell sound and a sound effect of power operating normally?" and the information showing positivity "YES (speaker operates normally)", the response "Did you attempt power rebooting?" and the information indicating positivity "YES (power rebooting attempted)".

According to an embodiment as described above with reference to FIG. 4, when the electronic device 100 provides at least one question for obtaining detailed information related to the main query to the user, the electronic device 100 may provide the user and the customer service assistant with information indicating that the question has already been answered positive or negative through the user query and thus, user convenience may be more enhanced.

In providing a question to obtain detailed information related to the main query to the user, the electronic device 100 may reduce the number of unnecessary questions by excluding the question that the user has already replied positive or negative through the user query, and thus, the number of questions required to obtain detailed information may be easily increased by reducing the number of unnecessary questions so the efficiency of the process of obtaining the detailed information may be remarkably improved.

Figure 5:
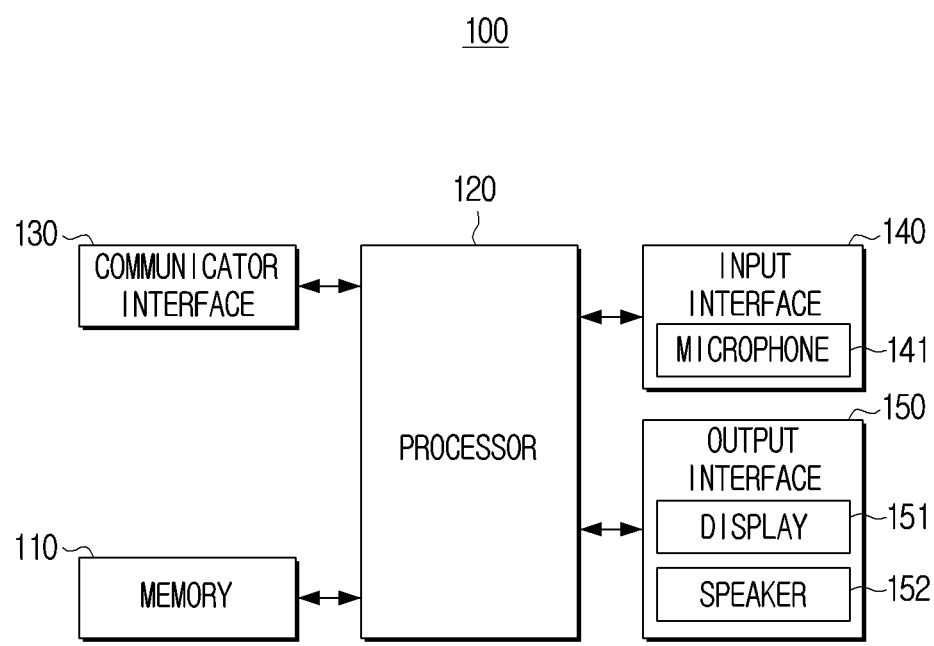
FIG. 5 is a diagram illustrating a configuration of an electronic device according to an embodiment of the disclosure.

FIG. 5 is a diagram illustrating a configuration of an electronic device in detail according to an embodiment of the disclosure.

As shown in FIG. 5, the electronic device 100 may further include a communicator interface 130, an input interface 140, and an output interface 150, as well as the memory 110 and the processor 120 as shown in FIG. 1. However, the configurations as shown in FIGS. 1 and 5 are merely exemplary, and in practicing the disclosure, a new configuration may be added or some configuration may be omitted in addition to the configuration as shown in FIGS. 1 and 5.

The communicator interface 130 may include a circuit and may communicate with an external device. The processor 120 may receive various data or information from an external device connected through the communicator interface 130 and may transmit various data or information to the external device.

The communicator interface 130 may include, for example but not limited to, one or more of a Wi-Fi module, a Bluetooth module, a wireless communication module, and a near field communication (NFC) module. Each of the Wi-Fi module and the Bluetooth module may perform communication by Wi-Fi method and Bluetooth method, respectively. When using the Wi-Fi module or the Bluetooth module, various connection information such as service set identifier (SSID) may be transmitted and received for communication connection and then various information may be transmitted and received.

The wireless communication module may communicate according to various communication specifications such as IEEE, Zigbee, $3^{rd}$ generation (3G), $3^{rd}$ generation partnership project (3GPP), long term evolution (LTE), $5^{th}$ generation (5G), or the like. The near field communication (NFC) module may communicate by the NFC method using a 13.56 MHz band among various RF-ID frequency bands such as 135 kHz, 13.56 MHz, 433 MHz, 860-960 MHz, 2.45 GHz, or the like.

In various embodiments according to the disclosure, the processor 120 may receive text information corresponding to a user query from an external device connected to the electronic device 100 through the communicator interface 130, and may control the communicator interface 130 to transmit text information corresponding to the at least one response to the external device.

The input interface 140 may include a circuit, and the processor 120 may receive a user command for controlling the operation of the electronic device 100 through the input interface 140. The input interface 140 may include a microphone 141, a camera (not shown), and a remote controller signal receiver (not shown), or the like. The input interface 140 may be implemented in a form included in the display 151 as a touch screen. The microphone 141 may receive a voice signal and convert the received speech signal to an electrical signal.

According to various embodiments of the disclosure, the processor 120 may receive a voice signal corresponding to a user query through the microphone 141 and may obtain text information corresponding to the user query based on the voice signal. The process of obtaining text information corresponding to a user query based on a voice signal may be performed through an automatic speech recognition (ASR) model, which is a so-called speech recognition model.

The output interface 150 may include a circuit, and the processor 120 may output various functions that the electronic device 100 may perform through the output interface 150. The output interface 150 may include at least one of a display 151, a speaker 152, or an indicator (not shown).

The display 151 may output image data under the control of the processor 120. The display 151 according to an embodiment may display a user interface (UI) by the control of the processor 120. The display 151 according to an embodiment may display a user interface (UI) stored in the memory 110. The display 151 according to an embodiment may be implemented as a liquid crystal display (LCD) panel, an organic light emitting diode (OLED) display, or the like, and the display 151 may also be implemented as a flexible display, a transparent display, or the like. However, the display 151 is not limited to a specific type.

The speaker 152 may output audio data by the control of the processor 120 and the indicator may be controlled (e.g., lit) by the control of the processor 120.

In various embodiments according to the disclosure, the processor 120 may control the display 151 to display text information corresponding to a response (e.g., the remaining response "did a malfunction of a screen occur immediately after charging?" and "is there heat generation?" in FIG. 2) to be provided to the user. The processor 120 may control the display 151 to display a user interface (UI) including text information corresponding to at least one response to be provided to the user, and may further receive a user input related to the at least one response through the UI displayed on the display 151. In an example embodiment, the processor 120 may further control the display 151 to display information corresponding to at least one response, other than the remaining response, such as "YES" (speaker operates normally) and "YES (power reboot attempted)" of FIG. 2.

The processor 120 may obtain a voice signal corresponding to at least one response based on the text information corresponding to the at least one response, and may output a voice signal corresponding to the at least one response through the speaker 152. The process of obtaining a speech signal corresponding to at least one response based on text information may be performed through a neural network model referred to as a so-called TTS model.

Figure 6:
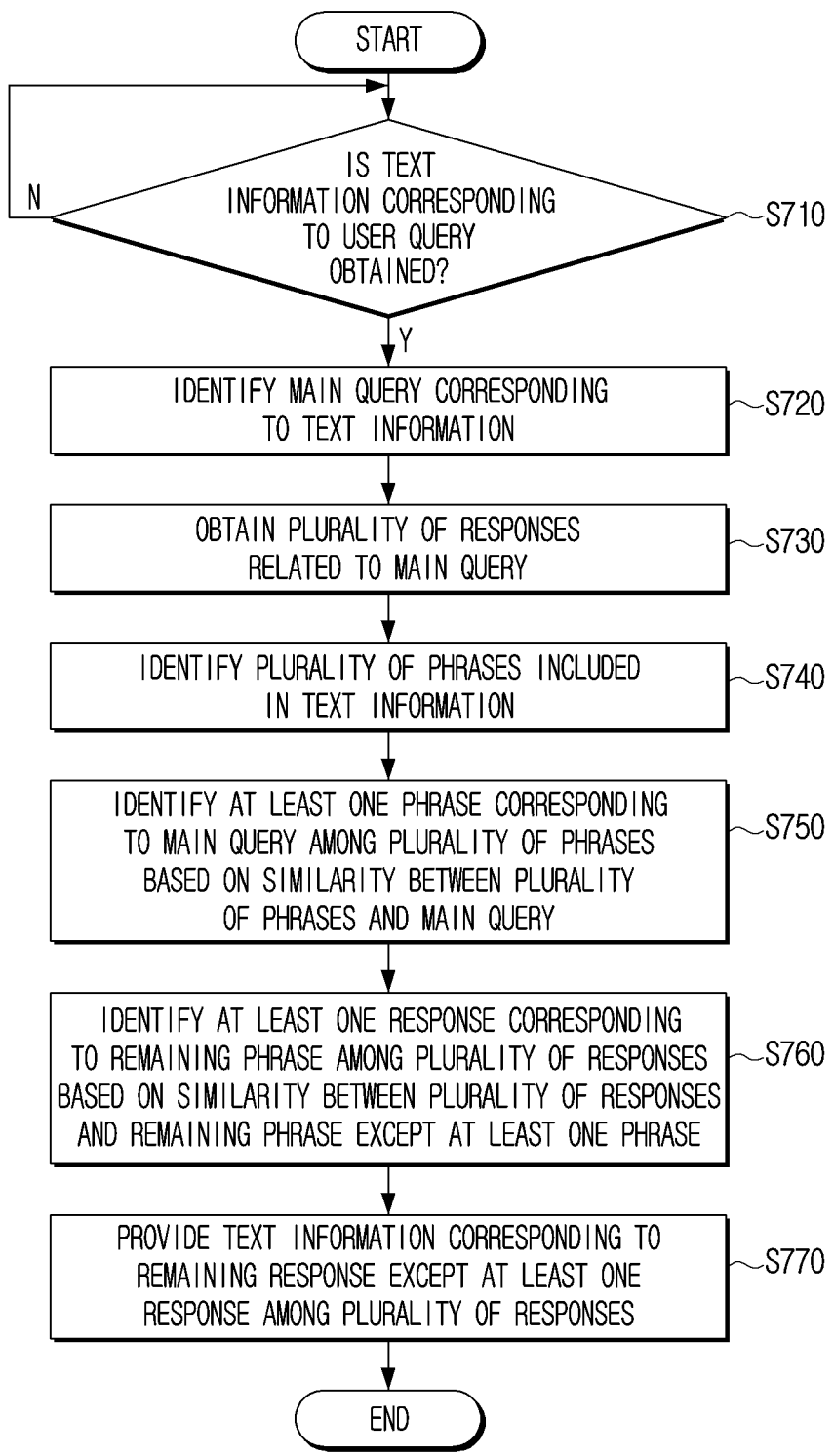
FIG. 6 is a flowchart illustrating a method of controlling an electronic device according to an embodiment of the disclosure.
Figure 7:
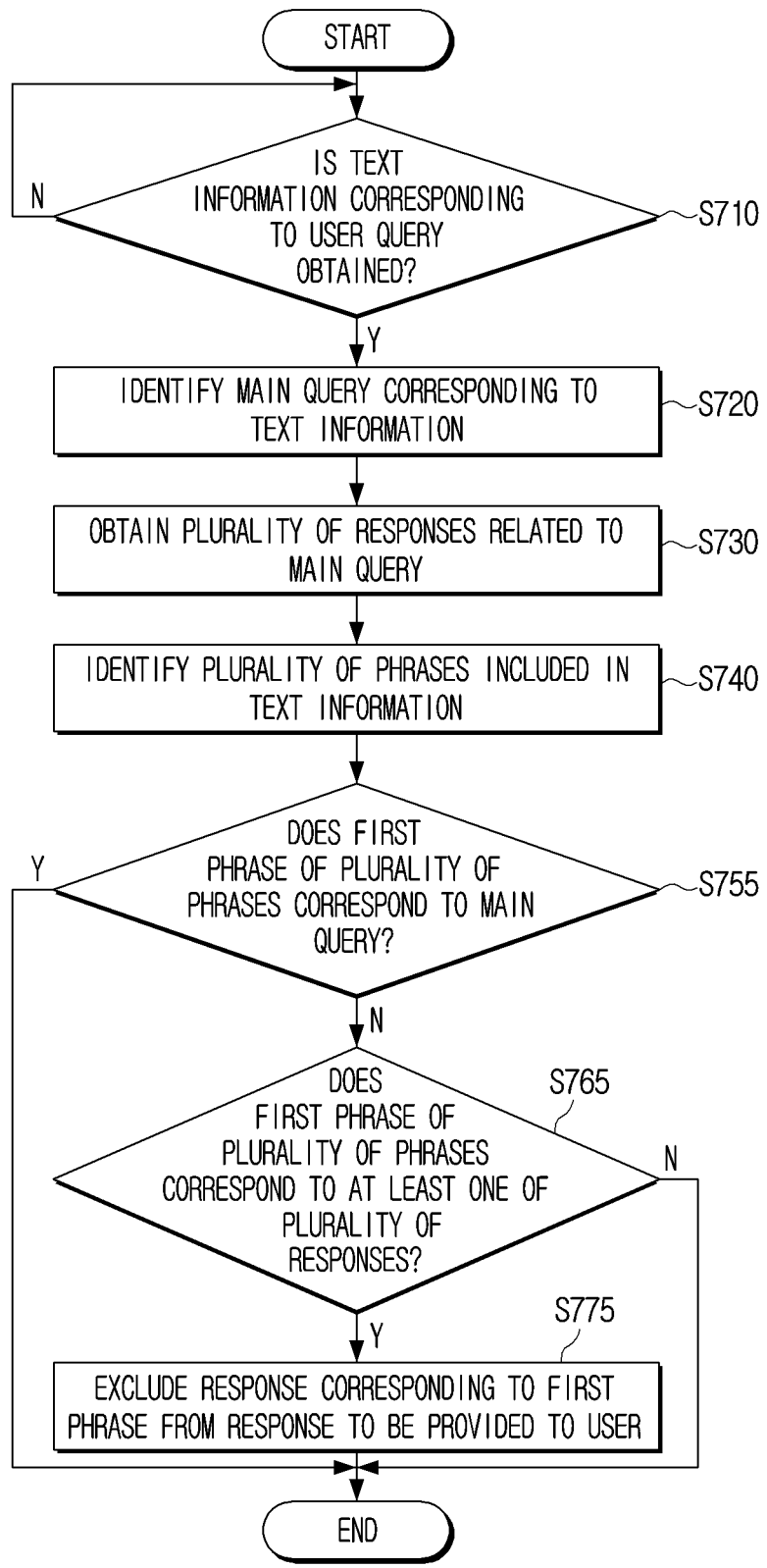
FIG. 7 is a flowchart illustrating a method of controlling an electronic device according to an embodiment of the disclosure.

FIG. 6 is a flowchart schematically illustrating a method of controlling an electronic device according to an embodiment of the disclosure and FIG. 7 is a flowchart illustrating a method of controlling an electronic device according to an embodiment of the disclosure in greater detail.

The electronic device 100 according to an embodiment may obtain text information corresponding to the user query in operation S710. Based on obtaining text information corresponding to a user query, the electronic device 100 may identify a main query corresponding to the text information in operation S720. The electronic device 100 may identify a main query that matches inputted text information among a plurality of predefined main queries.

If the main query is identified, the electronic device 100 may obtain a plurality of responses related to the main query in operation S730. The electronic device 100 may identify a plurality of responses that match the identified main query of the plurality of predefined responses.

The electronic device 100 may identify a plurality of phrases included in the text information in operation S740. The electronic device 100 may identify a plurality of phrases included in the text information by identifying each of the plurality of phrases included in the text information.

According to an embodiment, the electronic device 100 may identify a plurality of phrases included in the text information based on a conjunction, an ending mark, or a punctuation mark included in the text information. According to another embodiment, the electronic device 100 may identify a plurality of phrases included in the text information using a neural network model trained with a labeled data set.

The electronic device 100 may identify at least one phrase corresponding to the main query among the plurality of phrases based on a similarity between the plurality of phrases and the main query in operation S750. The process of identifying at least one phrase corresponding to a main query may include the steps of converting information on each of a plurality of phrases and the main queries into a vector and obtaining a first score that quantitatively indicates whether the vectors are present in a similar position in the vector space.

The electronic device 100 may identify at least one response corresponding to a remaining phrase except the at least one phrase among the plurality of responses based on a similarity between the plurality of responses and a remaining phrase except the at least one phrase in operation S760. The process of identifying at least one response corresponding to the remaining phrase of the plurality of responses may include converting information for each of the plurality of responses and the remaining phrase into a vector, and obtaining a second score that quantitatively indicates whether the vectors are present in a similar location in the vector space.

When at least one response is identified in S760, the electronic device 100 may provide text information corresponding to a remaining response except the at least one response among the plurality of responses in operation S770. The electronic device 100 may provide information related to the identified at least one response along with the text information corresponding to the identified remaining response.

Hereinafter, with reference to FIG. 7, a process of performing S750, S760, and S770 of FIG. 6 with respect to a first phrase, among a plurality of phrases, will be described in detail.

As shown in FIG. 7, the electronic device 100 may identify whether the first phrase of the plurality of phrases corresponds to a main query in operation S755. If the first phrase corresponds to a main query in operation S755—Y, the first phrase may be referred to as information used in the process of identifying the main query, and therefore, it is not necessary to identify whether the first phrase corresponds to at least one of the plurality of responses in S765. If the first phrase is not identified as corresponding to the main query in operation S755-N, the electronic device 100 may identify whether the first phrase of the plurality of phrases corresponds to at least one of the plurality of responses in operation S765.

If the first phrase is identified as corresponding to at least one of the plurality of responses in operation S765—Y, the electronic device 100 may exclude a response corresponding to the first phrase from the response to be provided to the user in operation S775. If the first phrase is not identified as corresponding to at least one of the plurality of responses in operation S765—N, the electronic device 100 may not exclude a response corresponding to the first phrase from the response to be provided to the user.

Although FIG. 7 illustrates only a process of processing a first phrase among a plurality of phrases, the electronic device may perform steps S750, S760, and S770 by performing the above-described process with respect to the remaining phrase except for the first phrase of the plurality of phrases.

Referring to FIGS. 6 and 7, the steps of identifying a main query corresponding to the text information in operation S720, identifying a plurality of responses related to the main query in operation S730, identifying a plurality of phrases included in the text information in operation S740, identifying at least one phrase corresponding to the main query among a plurality of phrases in operation S750, and identifying at least one response corresponding to the remaining phrases among a plurality of responses in operation S760 are illustrated as sequential steps, but the embodiment is not limited thereto. For example, a plurality of phrases included in the text information may be identified while a main query corresponding to the text information is identified, and at least one phrase corresponding to a main query among the plurality of phrases may be identified while a plurality of responses related to the main query are obtained.

As described above, the controlling method of the electronic device 100 may be implemented as a program and provided to the electronic device 100. In particular, a program that includes the controlling method of the electronic device 100 may be stored and provided in a non-transitory computer readable medium.

A non-transitory computer readable medium including a program to execute a method of controlling the electronic device 100 may be provided, and the method of controlling the electronic device 100 includes, based on obtaining text information corresponding to a user query, identifying a main query corresponding to the text information; obtaining a plurality of responses related to the main query; identifying a plurality of phrases included in the text information; identifying at least one phrase corresponding to the main query among the plurality of phrases based on a similarity between each of the plurality of phrases and the main query; identifying at least one response corresponding to a remaining phrase among the plurality of responses based on a similarity between each of the plurality of responses and a remaining phrase except the at least one phrase among the plurality of phrases; and providing text information corresponding to a remaining response except the at least one response among the plurality of responses.

The non-transitory computer readable medium refers to a medium that stores data semi-permanently rather than storing data for a very short time, such as a register, a cache, a memory, etc., and is readable by an apparatus. In detail, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The method of controlling the electronic device 100 and a computer-readable recording medium for performing a control method of the electronic device 100 may be provided. Various embodiments of the electronic device 100 described above may be applied to the method of controlling the electronic device 100 a computer-readable recording medium for performing a controlling method of the electronic device 100 and redundant description is omitted.

According to various embodiments of the disclosure as described above, the electronic device 100 may provide an optimized response to a user query by removing an unnecessary response from among a plurality of responses, that may be provided in response to the user query, by using information other than information corresponding to a main query among the information included in the user query. Accordingly, the efficiency and accuracy of the chatbot service in providing the response to the user query and the convenience of a user may be greatly improved, and the frequency of switching from the chatbot service to a customer service manager may be significantly reduced, thereby significantly increasing the utilization of the chatbot service.

A function associated with the neural network model and AI may be performed through the memory 110 and the processor 120.

The processor 120 may include one or a plurality of processors 120. At this time, one or a plurality of processors 120 may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors 120 control the processing of the input data in accordance with a predefined operating rule or artificial intelligence (AI) model stored in the non-volatile memory 110 and the volatile memory 110. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may include a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

A machine-readable storage medium may be provided in the form of a non-transitory storage medium. Herein, the term "non-transitory" only denotes that a storage medium does not include a signal only but is tangible, and does not distinguish the case in which a data is semi-permanently stored in a storage medium from the case in which a data is temporarily stored in a storage medium. For example, "non-transitory storage medium" may refer to a buffer temporarily storing data.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

Each of the components (for example, a module or a program) according to the embodiments may include one or a plurality of objects, and some subcomponents included in components described above may be omitted, or other subcomponents may be further included in the embodiments. Alternatively or additionally, some components (e.g., modules or programs) may be integrated into one entity to perform the same or similar functions performed by each respective component prior to integration.

Operations performed by a module, program, or other component, in accordance with the embodiments of the disclosure, may be performed sequentially, in a parallel, repetitive, or heuristic manner, or at least some operations may be performed in a different order, omitted, or other operations may be added.

The term "unit" or "module" used in the disclosure includes units includes hardware, software, or firmware, or any combination thereof, and may be used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100).

When the instruction is executed by a processor, the processor may perform the function corresponding to the instruction, either directly or under the control of the processor, using other components. The instructions may include a code generated by a compiler or a code executed by an interpreter.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic device for providing artificial intelligence (AI), guidance for resolving symptoms of an electronic product, comprising:
 a display;
 one or more processors; and
 memory storing instructions that, when executed by the one or more processors, cause the electronic device to:
  display a user interface (UI) on the display for obtaining a user input indicating a user query comprising a plurality of sentences, wherein the plurality of sentences comprise at least one symptom of the electronic product;
  determine first text information corresponding to the user query;
  identify, based on determining the first text information, a main query corresponding to the first text information, wherein the main query is determined based on at least one of a database comprising a plurality of predefined main queries or a first neural network model trained to identify one or more main queries corresponding to the first text information, and wherein the main query corresponds to a first symptom from among the at least one symptom;
  obtain a plurality of responses related to the main query from the database, wherein the database further comprises a first plurality of responses corresponding to the plurality of predefined main queries, and wherein the first plurality of responses comprises at least one from among:
   a response query corresponding second symptom of the electronic product, and
   a response corresponding to self-action to resolve the first symptom;
  identify a plurality of phrases included in the first text information based on at least one of a conjunction, an ending mark, a punctuation mark, or based on a second neural network model trained with a labeled data set of text information;
  identify at least one first phrase corresponding to the main query among the plurality of phrases based on a first similarity in a first vector space between each of the plurality of phrases and the main query, wherein the first vector space is constructed based on a feature extraction model or word embedding model, the first vector space comprises the plurality of phrases and the main query, and the first similarity is determined based on positions in the first vector space of the plurality of phrases compared to the main query;
  identify, among the plurality of responses, at least one first response corresponding to a remaining second phrase, among the plurality of phrases except the at least one first phrase, based on a second similarity in a second vector space between each of the plurality of responses and the remaining second phrase, wherein the second vector space comprises the plurality of responses and the remaining second phrase, and the second similarity is determined based on positions in the second vector space of the plurality of responses compared to the remaining second phrase, and wherein the at least one first response comprises at least one response query corresponds to at least one third symptom of the electronic product;
  identify at least one context corresponding to the remaining second phrase among a plurality of predefined contexts;
  identify the at least one first response, among the plurality of responses, corresponding to the at least one context;
  filter the plurality of response to exclude the at least one first response; and
  display, in the user interface, second text information corresponding to a remaining second response, the remaining second response corresponding to at least one fourth symptom of the electronic product and being a response other than the at least one first response among the plurality of responses, wherein the remaining second response is determined based on positions in the second vector space of the plurality of responses compared to the remaining second response;
 wherein the electronic device further comprises a microphone and a speaker, and
 wherein the one or more processors are configured to execute the instructions to cause the electronic device to:
  receive a first voice signal corresponding to the user query through the microphone,
  obtain the first text information based on the first voice signal,
  obtain a second voice signal corresponding to the at least one first response based on text information corresponding to the at least one first response, and
  output the second voice signal through the speaker.

2. The electronic device of claim 1, wherein the one or more processors are configured to execute the instructions to cause the electronic device to:
 obtain, with respect to each of the plurality of phrases, a first score based on the first similarity between the main query and each of the plurality of phrases, and
 identify the at least one first phrase, among the plurality of phrases, of which the first score is greater than or equal to a preset first threshold value.

3. The electronic device of claim 1, wherein the one or more processors are configured to execute the instructions to cause the electronic device to:
 obtain, with respect to each of the plurality of responses, a second score based on the second similarity between the remaining second phrase and each of the plurality of responses, and
 identify the at least one first response, among the plurality of responses, of which the second score is greater than or equal to a preset second threshold value.

4. The electronic device of claim 1, wherein the one or more processors are configured to execute the instructions to cause the electronic device to identify the plurality of phrases included in the first text information based on at least one of a conjunction, an ending mark, or a punctuation included in the first text information.

5. The electronic device of claim 1, wherein the one or more processors are configured to execute the instructions to cause the electronic device to, based on information indicative of positivity or negativity for the at least one first response being included in the remaining second phrase, provide the at least one first response and the information indicative of positivity or negativity for the at least one first response along with the second text information corresponding to the remaining second response.

6. The electronic device of claim 1, further comprising:
a communicator interface,
wherein the one or more processors are configured to execute the instructions to cause the electronic device to:
receive the first text information from an external device through the communicator interface, and
control the communicator interface to transmit the second text information corresponding to the remaining second response to the external device.

7. The electronic device of claim 1,
wherein the one or more processors are configured to execute the instructions to cause the electronic device to:
receive a user input related to the remaining second response through the UI.

8. A method of controlling an electronic device, the method comprising:
displaying a user interface (UI) on a display for obtaining a user input indicating a user query comprising a plurality of sentences, wherein the plurality of sentences comprise at least one symptom of the electronic product;
determining first text information corresponding to the user query;
identifying, based on determining the first text information, a main query corresponding to the first text information, wherein the main query is determined based on at least one of a database comprising a plurality of predefined main queries or a first neural network model trained to identify one or more main queries corresponding to the first text information, and wherein the main query corresponds to a first symptom from among the at least one symptom;
obtaining a plurality of responses related to the main query from the database, wherein the database further comprises a first plurality of responses corresponding to the plurality of predefined main queries, and wherein the first plurality of responses comprises at least one from among:
a response query corresponding to a second symptom of the electronic product, and
a response corresponding to self-action to resolve the first symptom;
identifying a plurality of phrases included in the first text information based on at least one of a conjunction, an ending mark, a punctuation mark, or based on a second neural network model trained with a labeled data set of text information;
identifying at least one first phrase corresponding to the main query among the plurality of phrases based on a first similarity in a first vector space between the plurality of phrases and the main query, wherein the first vector space is constructed based on a feature extraction model or word embedding model, the first vector space comprises the plurality of phrases and the main query, and the first similarity is determined based on positions in the first vector space of the plurality of phrases compared to the main query;
identifying, among the plurality of responses, at least one first response corresponding to a remaining second phrase, among the plurality of phrases except the at least one first phrase, based on a second similarity in a second vector space between each of the plurality of responses and the remaining second phrase, wherein the second vector space comprises the plurality of responses and the remaining second phrase, and the second similarity is determined based on positions in the second vector space of the plurality of responses compared to the remaining second phrase, and wherein the at least one first response comprises at least one response query corresponds to at least one third symptom of the electronic product;
identifying at least one context corresponding to the remaining second phrase among a plurality of predefined contexts;
identifying the at least one first response, among the plurality of responses, corresponding to the at least one context;
filtering the plurality of response to exclude the at least one first response; and
displaying, in the user interface, second text information corresponding to a remaining second response, the remaining second response corresponding to at least one fourth symptom of the electronic product and being a response other than the at least one first response among the plurality of responses, wherein the remaining second response is determined based on positions in the second vector space of the plurality of responses compared to the remaining second response,
wherein the electronic device further comprises a microphone and a speaker, and
wherein the one or more processors are configured to execute the instructions to cause the electronic device to:
receive a first voice signal corresponding to the user query through the microphone,
obtain the first text information based on the first voice signal,
obtain a second voice signal corresponding to the at least one first response based on text information corresponding to the at least one first response, and
output the second voice signal through the speaker.

9. The method of claim 8, wherein the identifying the at least one first phrase comprises:
obtaining, with respect to each of the plurality of phrases, a first score based on the first similarity between the main query and each of the plurality of phrases; and
identifying the at least one first phrase of which the first score is greater than or equal to a preset first threshold value.

10. The method of claim 8, wherein the identifying the at least one first response comprises:
obtaining, with respect to each of the plurality of responses, a second score based on the second similarity between the remaining second phrase and each of the plurality of responses; and
identifying the at least one first response, among the plurality of responses, of which the second score is greater than or equal to a preset second threshold value.

11. The method of claim 8, wherein the identifying the plurality of phrases comprises identifying the plurality of phrases included in the first text information based on at least one of a conjunction, an ending mark, or a punctuation included in the first text information.

* * * * *